No. 867,765. PATENTED OCT. 8, 1907.
W. H. STRICKLER.
AUTOMATIC STEERING MECHANISM FOR VEHICLES.
APPLICATION FILED FEB. 19, 1907.
2 SHEETS—SHEET 2.
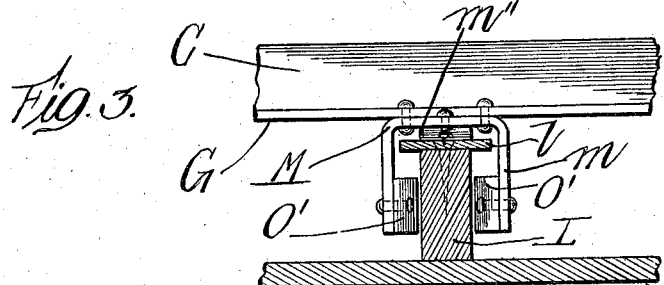
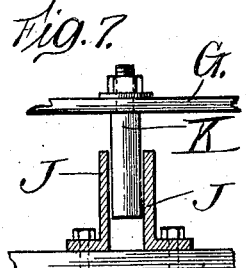
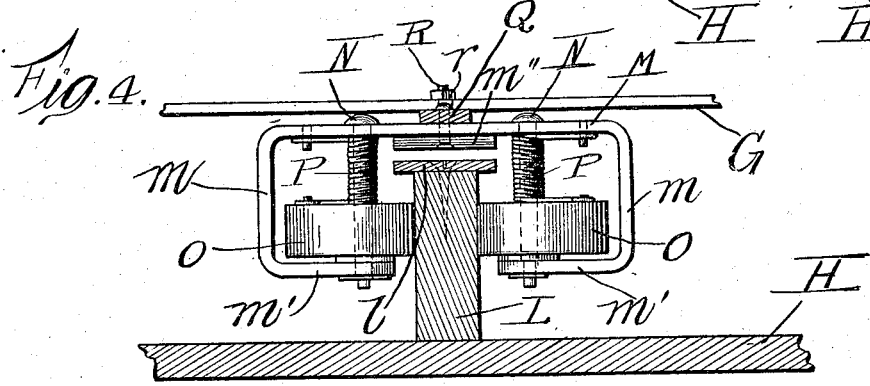
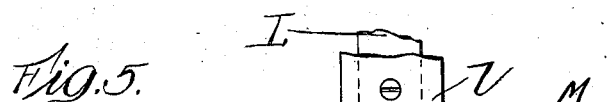
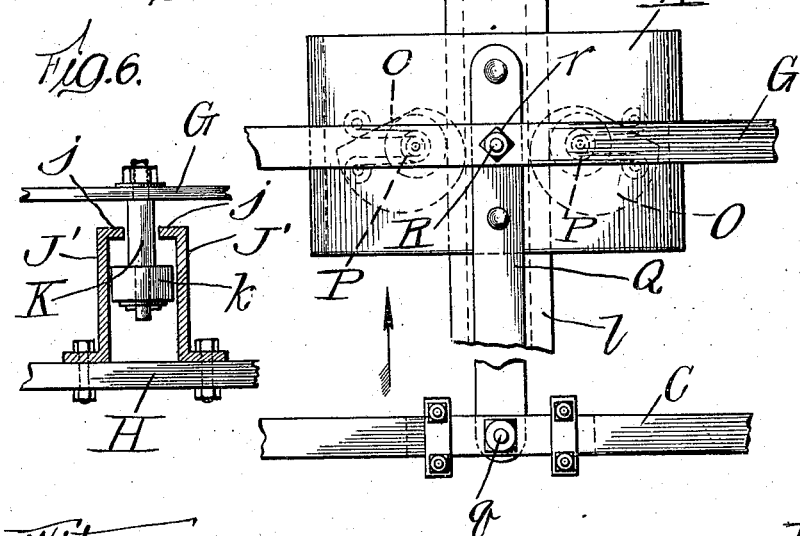

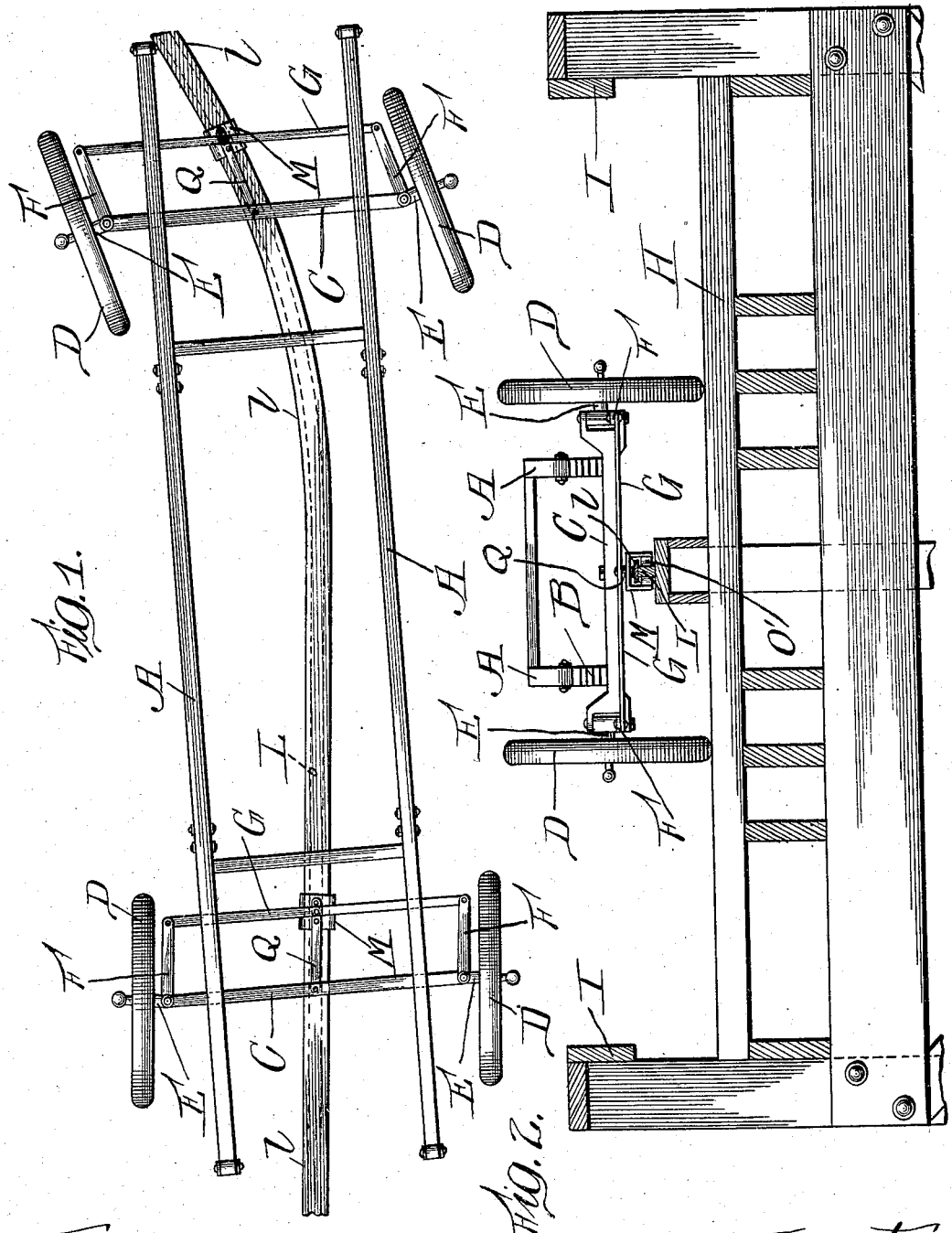

UNITED STATES PATENT OFFICE.

WILLIAM H. STRICKLER, OF CHICAGO, ILLINOIS.

AUTOMATIC STEERING MECHANISM FOR VEHICLES.

No. 867,765.

Specification of Letters Patent.

Patented Oct. 8, 1907.

Application filed February 19, 1907. Serial No. 358,281.

*To all whom it may concern:*

Be it known that I, WILLIAM H. STRICKLER, a citizen of the United States, residing at Chicago, in the county of Cook and State of Illinois, have invented certain new and useful Improvements in Automatic Steering Mechanism for Vehicles, of which the following is a specification.

My original aim was to provide means for automatically steering the cars of gravity roads (roller coasters) such as are used for pleasure purposes, but the invention is equally applicable to motor-driven cars, whether used for pleasure or commercial purposes. The steering gear of the car is of the automobile type and the automatic steering is accomplished by a device hereinafter called a runner, which may be variously constructed, attached to the connecting rod of the steering gear and engaging a guide which follows the course of a railless track.

The invention consists in the features of novelty that are hereinafter described with reference to the accompanying drawings which are made a part hereof and in which:

Figure 1 is a plan view of the running gear of a car and of the improved automatic steering mechanism.
Fig. 2 is a front elevation thereof and a vertical transverse section of the track. Fig. 3 is sectional elevation showing a modification of the steering mechanism. Fig. 4 is a sectional elevation and Fig. 5 a plan view showing another modification thereof.
Figs. 6 and 7 are sectional elevations showing still other modification thereof.

A represents the frame of the car, B the springs, C the axle to which the springs are secured, D the wheels, which preferably have pneumatic tires, E the stub-axles independently pivoted to the axle C, F the arms projecting forward from the stub axles and G the rod jointed to the arms F and connecting them. The parts lettered E, F and G constitute a steering gear of the automobile type. I desire to have it understood, however, that the invention is not limited to a steering gear of this or any other particular construction, but comprehends any steering gear of the automobile type having means including a rod or other laterally movable part for connecting the independently pivoted wheels.

The track H is without rails and has at each side a safety railing I which does not come into service excepting in case of an accident, which is a highly improbable contingency when the improved steering mechanism is used.

In some roller coasters as now constructed, the track is without rails for the carrying wheels but provided at the sides with railings such as shown at I, and these side railings coöperate with small horizontal wheels on the sides of the car for steering it, the railings being so close together that the car is capable of moving laterally only a few inches. With this arrangement there is more or less bumping as the car swerves from side to side, but this is wholly eliminated by my improved automatic steering mechanism.

A simple form of the improved steering mechanism is shown in Fig. 7. It consists of a pair of parallel rails J secured to the track at a suitable distance apart and forming a guide for a runner consisting of a stud K secured to the rod G and projecting downward into the space between the rails. There is but little clearance between the guide and the runner, so that the latter, and consequently the wheels have but little random movement. This is true of all of the several forms of the invention.

In the form shown in Fig. 6 the guide is made of a pair of parallel rails J' having at their upper margins, inturned flanges j and the runner consists of a stud K' carrying an antifriction roller k. The space between flanges j is less than the diameter of the roller so that the shoulders presented by their undersides prevent the runner from escaping from the guide in case the car should be thrown upward as a result of running over an object on the track.

The preferred form of the invention is shown in Figs. 4 and 5. The guide consists of a timber, or heavy wooden strip L and an iron plate l secured to the top of it and extending beyond its vertical sides so as to form a T. This plate serves as a guard for preventing the runner from escaping from the guide. The runner has a housing M comprising a top, two vertical sides m and two in-turned horizontal arms m'. Pivot pins N pass, vertically, through the top and arms, and on each of them an eccentric shoe O is loosely mounted so as to be capable of turning thereon. The shoes are held in normal position by springs P surrounding the pins and reacting in one direction against the housing and in the other direction against the shoes. When in normal positions their minimum radii are presented forward, or in the direction of travel, as indicated by the arrow in Fig. 5. To the underside of the top of the housing is secured a wear plate m'' having a rounded under surface for contacting with the guard l in case the housing is depressed. To the top of the housing is rigidly attached the forward portion of a bar Q the rear end of which is pivoted to the axle C as shown at q. The housing, the bar and the rod are perforated for the passage of a bolt R, having at its upper end a portion of reduced diameter threaded for the reception of a nut r.
The shoulder resulting from the reduced diameter prevents the nut from clamping the rod G and thereby preventing its free movement about the bolt as the runner moves laterally in obedience to sinuosities of the guide.

The eccentrics, in addition to serving as shoes, also serve as a safety device for preventing retrograde movement of the car. When set in the manner above described, upon a retrograde movement of the car the friction of the guide upon them will turn them and cause them to grip the guide and thereby quickly stop the car.

The form of the invention shown in Figs. 1, 2 and 3 is constructed as shown in Figs. 4 and 5, excepting that the housing does not have the inwardly projecting horizontal arms and the shoes consist of solid blocks $O'$ secured to the sides $m$ of the housing and having curved inner surfaces presented to the guide.

With a steering gear of the type shown, the wheels being independently pivoted upon vertical axes close to a vertical diametrical line passing through the centers of the wheels, the wheels turn about their pivotal axes with great freedom and respond very quickly to the action of the steering mechanism in turning curves.

In Figs. 1 and 2 I have shown the improved steering mechanism applied to both the front and rear wheels, but this is not necessary as I have found that the rear wheels will follow the front wheels if the steering mechanism be applied to the front wheels only. In entering a curve the rear wheels may swerve more or less but they quickly recover and follow the curve as truly as do the front wheels.

What I claim as new and desire to secure by Letters Patent is:

1. The combination with a car having independently pivoted wheels, and means including a laterally movable part for connecting them, of automatic steering mechanism having a fixed guide, a runner engaging said guide and means for connecting the runner to said laterally movable part.

2. The combination with a car having independently pivoted wheels and means including a laterally movable part connecting them, of automatic steering mechanism having a guide, a runner engaging the guide, a guard for preventing the disengagement of the runner and guide and means for connecting the guide to said laterally movable part.

3. The combination with a car having independently pivoted wheels and means including a laterally movable part connecting them, of automatic steering mechanism having a guide, a runner engaging the guide, means for pivotally connecting the runner to said laterally movable part, and a bar rigidly attached to said runner at one end and at the other pivotally attached to a fixed part of the car.

4. The combination with a car having independently pivoted wheels and means including a laterally movable part connecting them, of automatic steering mechanism having a guide, a runner engaging the guide, and means for connecting the runner to said laterally movable part, said runner having a housing and shoes carried by the housing for contacting with the guide.

5. The combination with a car having independently pivoted wheels and means including a laterally movable part connecting them, of automatic steering mechanism having a guide a runner engaging the guide and means for connecting the runner to the laterally movable part, said runner having pivoted shoes mounted eccentrically and adapted to contact with the guide.

6. The combination with a car having independently pivoted wheels and means including a laterally movable part for connecting them, of automatic steering mechanism having a guide, a runner engaging the guide and means for connecting the runner to said laterally movable part, said runner having pivoted shoes mounted eccentrically and adapted to contact with the guide, and springs for holding said shoes normally with their minimum radii presented forward.

7. The combination with a car having independently pivoted wheels and means for connecting them, of automatic steering mechanism having a guide, a runner engaging the guide and means for connecting the runner to the means for connecting the wheels, the runner having shoes adapted to engage the guide, and springs for yieldingly holding the shoes normally in contact with the guide.

WILLIAM H. STRICKLER.

Witnesses:
L. M. HOPKINS,
L. S. MATUSZEWICZ.